United States Patent [19]
Moline

[11] 3,807,767
[45] Apr. 30, 1974

[54] TRAILER AND TOWING VEHICLE ALIGNMENT METHOD AND APPARATUS

[76] Inventor: Arthur W. Moline, 416 S.W. 124th, Seattle, Wash. 98146

[22] Filed: Feb. 5, 1973

[21] Appl. No.: 329,715

[52] U.S. Cl............ 280/477, 280/475, 280/150.5, 254/120, 254/131, 280/3
[51] Int. Cl............................. B60d 3/00, B60d 1/00
[58] Field of Search....... 280/477, 478, 479, 3, 475, 280/150.5; 254/120, 131

[56] References Cited
UNITED STATES PATENTS
| | | | |
|---|---|---|---|
| 3,084,953 | 4/1963 | McGregor | 280/150.5 |
| 3,482,847 | 12/1969 | Hart | 280/150.5 X |
| 3,614,115 | 10/1971 | Berglund | 280/5.32 |

*Primary Examiner*—Leo Friaglia
*Attorney, Agent, or Firm*—John O. Graybeal

[57] ABSTRACT

A method and means for supporting and laterally shifting a trailer into alignment for attachment to a towing vehicle. When initially placing the trailer, for example at a camp site, a shifting foot is fitted onto the bottom end of the trailer jack to support the trailer from a ground surface. To connect the trailer to a towing vehicle, the towing vehicle is brought into reasonable proximity to the trailer, and then the position of the trailer itself is adjusted laterally to bring it into proper alignment with the towing vehicle. To accomplish this, a shifting rod is used to engage the shifting foot in a recess thereof and also engage the ground surface (or a platform on the ground) as a fulcrum to apply a lateral shifting force against the shifting foot and into the trailer jack to bring the trailer tongue into alignment with the towing vehicle.

12 Claims, 6 Drawing Figures

PATENTED APR 30 1974    3,807,767

TRAILER AND TOWING VEHICLE ALIGNMENT METHOD AND APPARATUS

BACKGROUND OF THE INVENTION

1. Field of the Invention

The present invention relates to a process and means for bringing a trailer and a towing vehicle into proper alignment for being attached to one another.

2. Description of the Prior Art

The conventional present day camping trailer or the like is provided with a forwardly extending tongue by which the trailer is attached to a trailer hitch of a towing vehicle. To support the front portion of the trailer when the trailer is placed at a camping site, there is generally a trailer jack mounted to the tongue. When the trailer is in place, the trailer jack is operated to bring it into ground engagement and then to level the trailer. When the trailer is again to be connected to a towing vehicle, the jack is operated to move the trailer tongue vertically into connecting engagement with the trailer hitch of the towing vheicle which has previously been maneuvered into proper lateral alignment. In each instance, the basic function of the jack is vertical adjustment of the front end of the trailer.

The common method of obtaining proper alignment between the towing vehicle and the trailer tongue, which method is practiced by thousands if not millions of Americans having housing or camping trailers, is to carefully back the towing vehicle (usually an automobile or pickup truck) in near perfect alignment with the hitching socket of the trailer tongue. Quite often, this is a two person operation, with an observer calling directions to the driver, as the automobile is backed toward the trailer. Usually this is a trial and error method, with driver backing into the automobile several times to obtain adequately close lateral alignment.

With the present widespread use of camping trailers and the like that has developed in the last several decades, the functions of the various components of the trailer and the towing vehicle have now become somewhat stereotyped or rigidized in the minds of people involved in their use, manufacture, etc. The trailer, when put in place, becomes a temporary home. When placed, it is leveled, stabilized, and for all practical purposes planted with sufficient firmness to the ground surface so that its occupants can, for their stay at that location, feel "at home." The towing vehicle, i.e., the family automobile, has become stereotyped as the mobile vehicle, the precise position of which can be readily adjusted by the skillful manipulation of the driver. In the usual practice, when the automobile is brought into proper alignment with the socket hitch of the trailer tongue, the only movement required in the trailer is simply to lower the trailer tongue by means of the jack onto the trailer hitch of the automobile.

In the manufacture of the trailer and trailer components, the common thinking or attitude toward the functions of the various trailer components have likewise become stereotyped. The function of the trailer jack is to adjust the trailer vertically and to stabilize the trailer at a level position as a firm support column. To provide the trailer with stability, the trailer jack is made with sufficient strength to resist lateral loading, such as may be applied by wind forces against the trailer or pushing or vibrating of the trailer by movement of people therein, etc. The various mechanisms that are incorporated in trailer jacks are constructed to accomplish these functions.

To illustrate the general state of the art with regard to mechanisms for adjustable vertical support in other applications, the following patents are cited as representative examples: Stauffer, U.S. Pat. No. 252,401; Carberry, U.S. Pat. No. 862,609; Stein, U.S. Pat. No. 1,099,405; Beaver, U.S. Pat. No. 1,702,027; Mermelstein, U.S. Pat. No. 2,750,149 and Staples, U.S. Pat. No. 3,355,136.

SUMMARY OF THE INVENTION

The present invention is based upon the approach that a more effective method of bringing a trailer and a towing vheicle into lateral alignment with each other can be accomplished by a reversal of the traditional roles of the towing vehicle and the trailer, and on recognition that the inherent lateral stability provided in conventional trailer jacks can effectively be utilized for transmitting lateral adjusting forces through the trailer jack to the trailer to bring the trailer itself into alignment with the towing vehicle. In the process of the present invention, in initially placing the trailer, a shifting foot is provided in interfitting relationship with the trailer jack so as to support the trailer jack from a ground surface. This shifting foot has a downwardly directed through opening adapted to receive a shifting rod to bear against a force transmitting surface in the shifting foot so that the shifting rod, with the ground surface as a fulcrum, can cause lateral shifting of the trailer.

In the preferred form the shifting foot has a socket-like connecting portion by which it is attached to the lower end of the trailer jack in interfitting relationship so that it is substantially rigid with the jack with respect to angular deviation from the vertical axis of the jack. The shifting foot also has a ground support portion having a lower surface adapted to engage the ground. There is a downwardly open slot at the lower end of the shifting foot in vertical alignment with the trailer jack. The upper end of the slot (which is the force transmitting surface of the foot) is only moderately above the ground engaging surface so that the shifting rod can engage the ground surface at a location sufficiently close to the force transmitting surface so that a proper mechanical advantage can be obtained for lateral shifting of the trailer.

According to a second embodiment of the invention, a ground engaging platform is provided integral with the shifting foot, with a horizontal slot in the platform to provide for ground engagement of the shifting rod through this slot.

In the process of the present invention, to connect the trailer to the towing vehicle, first the towing vehicle is maneuvered into approximate lateral alignment with the trailer tongue. Then by application of the shifting rod against the shifting foot, the trailer itself is moved into lateral alignment with the towing vehicle.

DESCRIPTION OF THE PREFERRED EMBODIMENTS

Figure 1:
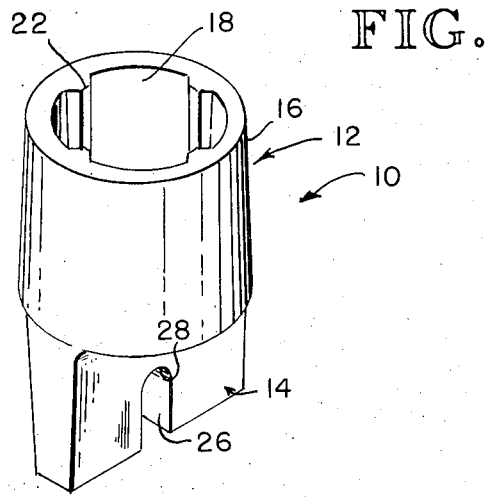
FIG. 1 is an isometric view illustrating the shifting foot of the present invention.
Figure 2:
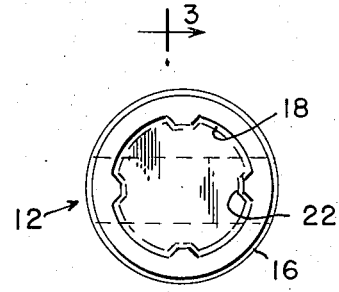
FIG. 2 is a top plan view of the shifting foot of FIG. 1.

In FIGS. 1 through 4, there is shown a first embodiment of a shifting foot made according to the present invention, generally designated 10, comprising an upper connecting portion 12 and a lower ground engaging portion 14. The connecting portion 12 is made up of a cylindrical sidewall 16 defining a central vertically aligned socket 18 arranged to receive the lower end of a post 20 of a trailer jack. In the preferred form, vertical ribs 22 are formed along the wall surface defining the socket 18 for better engagement of the post 20. The socket 18 may be stepped to accommodate different sized trailer jacks, or the socket may be made to fit with a trailer jack of maximum diameter, with bushings being provided to interfit with smaller jacks (such a bushing being shown at 21 in FIG. 4).

At about the mid-height of the foot 10, there is a horizontal wall 24 defining the bottom of the socket 18 and connecting to the ground engaging portion 14 of the foot 10. This ground engaging portion 14 is a plate like member extending downwardly from the upper connecting portion 12, and has formed at the lower middle portion thereof a downwardly open vertical slot 26, and a lower ground engaging surface 27. This slot 26 is generally coincident with the vertical center axis of the socket 18, so that the vertical loads from the jack post 20 in the socket 18 are transmitted substantially through the foot 10 at the location of the slot 26. The rounded, downwardly facing surface portion 28 that defines the upper portion of the slot 26 comprises the force transmitting surface by which the lateral shifting forces are transmitted through the foot 10 into the post 20 of the trailer jack. This force transmitting surface 28 is only moderately above the ground engaging surface 26 (e.g., about 1 inch) so that a proper mechanical advantage can be obtained from the force transmitting surface 28 to the ground surface.

Figure 6:
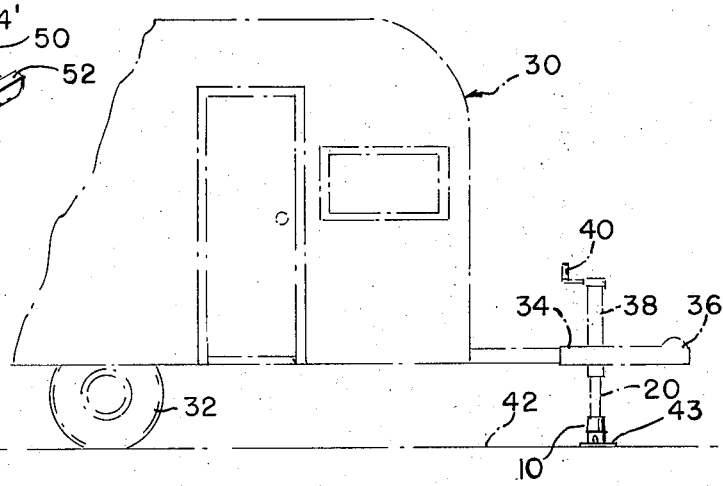
FIG. 6 illustrates the shifting foot in place on a trailer jack.

The operation of the present invention is described with reference to FIG. 6, wherein there is shown a conventional camping trailer 30 having a pair of wheels 32 and a forwardly extending tongue 34. At the extreme forward end of the tongue 34 there is a socket hitch 36 by which the tongue 34 is attached to a trailer hitch carried by a towing vehicle such as a conventional automobile (not shown herein). Rearwardly of the socket hitch 36 is a conventional trailer jack 38 having an actuating crank 40 and further comprising the aforementioned post 20.

When the trailer is towed into a camping area and stopped at a suitable camp site, the foot 10 is placed onto the lower end of the jack post 20 which fits into the foot socket 18, and the crank 40 is manipulated to cause the post 20 to travel downwardly to bring the ground engaging surface 27 of the foot 10 into engagement with the ground 42. If the ground surface 42 is somewhat soft, a small support platform such as a small flat piece of a wood plank, as at 43, may be placed between the foot 10 and the ground surface 42 for better ground support. The towing vehicle may then be disconnected, and the jack 38 is then operated in a conventional manner to level the trailer 30.

Figure 3:
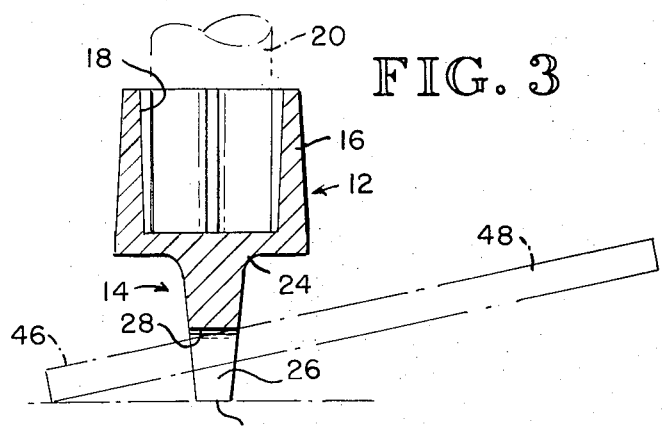
FIG. 3 is a sectional view taken along line 3—3 of FIG. 2, illustrating the mode of operation of the present invention.
Figure 4:
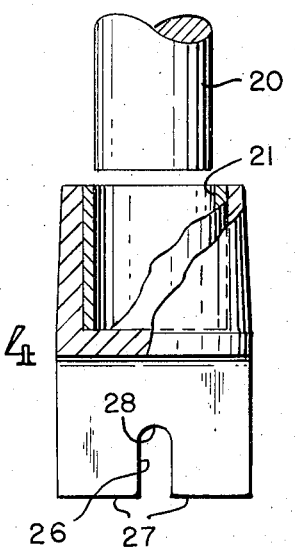
FIG. 4 is a partial vertical sectional view of the shifting foot, showing the shifting foot being placed onto the lower end of a trailer jack.

When it is desired to hook up the trailer to the towing vehicle, the towing vehicle is backed toward the trailer so that the trailer hitch on the vehicle is in approximate alignment contiguous the trailer socket hitch 36, but not necessarily in precise alignment therewith. (The ball of the trailer hitch may be as much as 5 or 6 inches to one side or the other of the socket hitch 36.) At this point, rather than moving the towing vehicle forward and then back again several times to bring the towing vehicle into precise alignment for hookup, the person utilizes the method illustrated in FIG. 3. A shifting rod 44, in the form of a cylindrical rod of metal of moderate length (e.g., a foot or so) is inserted through the slot 26 in the foot 10, so that the front end 46 of the rod 44 extends a moderate distance (e.g., 1 to 2 inches or so) beyond the slot 26. The opposite end 48 of the rod 44 is grasped in the person's hand and moved in an arc upwardly and laterally to move the foot upwardly and laterally (to the left as shown in FIG. 3). Since the foot 10 has a substantially rigid interfit with the post 20 with respect to an angular movement from the vertical axis of the post 20, the post 20 is caused to move laterally. Also, since the conventional trailer jack 38 has reasonably substantial strength with regard to lateral force applied thereto, the jack 38 is well adapted to carry the side loading transmitted from the foot 10 and impart this through the trailer tongue 34 to shift the entire trailer 30 laterally. By thus manipulating the shifting rod 44 through several lifts, the front of the trailer is moved in several short increments laterally to bring it into proper alignment with the towing vehicle. When this alignment is accomplished, the socket hitch 36 can be attached to the trailer hitch on the towing vehicle in a conventional manner.

Figure 5:
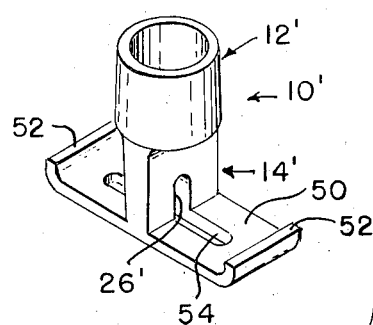
FIG. 5 is a second embodiment of the shifting foot of the present invention.

A second embodiment of the present invention is illustrated in FIG. 5. Wherein components similar to the first embodiment will be given like numerical designations, with a prime (') designation distinguishing those of the second embodiment. Thus, the foot 10' has an upper connecting portion 12' and a lower ground engaging portion 14', with a vertical slot 26' in the ground engaging portion 14'. At the lower end of the ground engaging portion 14' is a laterally extending plate 50 having upturned side portions 52 to facilitate lateral sliding of the plate 50 in relation to the ground surface. Also, there is a laterally extending slot (about 3 ½ inches long) 54 in the plate 50 laterally aligned with and opening to the vertical slot 26'. This slot 54 permits the shifting rod 44 to be inserted through the slot 26' and also through this slot 54 to engage the ground surface, and permit the shifting action of the rod 44. Thereafter the rod 44 is manipulated as discussed above in the description of the operation of the first embodiment.

What is claimed is:

1. In a trailer having a tongue for towing the trailer and a jack for vertical support of the trailer at a forward location on the trailer, a method of supporting the trailer and bringing the trailer and a towing vehicle into proper lateral alignment for attaching the trailer tongue to a towing vehicle, said method comprising:

a. initially placing a shifting foot in interfitting relationship with said trailer jack and supporting the trailer from a ground surface by said shifting foot acting through said trailer jack, with a downwardly directed through recess of the shifting foot being disposed laterally for lateral engagement by a shifting rod, b. moving the towing vehicle relative to the trailer so that a trailer hitch on the towing vehicle is in proximity with the trailer tongue, and c. placing the shifting rod in the slot of the shifting foot with an end portion of the shifting rod engaging the ground surface, and pressing the rod upwardly and laterally against the shifting foot with the ground surface as the fulcrum in lever fashion to apply a lateral shifting force against the shifting foot and into the trailer jack to bring the trailer tongue into proper alignment with the trailer hitch of the towing vehicle.

2. The process as recited in claim 1, wherein a ground support platform is placed to support said foot from said ground surface.

3. The method as recited in claim 2, wherein said support platform is movable relative to the shifting foot.

4. The method as recited in claim 2, wherein said support platform is provided integrally with said shifting foot.

5. The method as recited in claim 4, wherein said shifting rod is manipulated through a lateral slot in said support platform to move the shifting foot and trailer jack.

6. For use in aligning a trailer having a tongue and a trailer jack with respect to a towing vehicle, a shifting foot adapted for engagement with the trailer jack for support and lateral adjustment of the trailer, said shifting foot comprising:

a. a trailer jack connecting portion adapted to engage the trailer jack in interfitting relationship so that the shifting foot is substantially rigid to the jack with respect to angular deviation from a vertical axis of the jack, b. a ground support portion having a lower ground engaging surface to engage a ground support surface to support the trailer through the jack, c. said transfer foot having a downwardly directed force transmitting surface defining a through recess, said force transmitting surface being positioned moderately above said ground engaging surface so as to be able to receive a shifting rod at a position where said shifting rod can engage the ground surface as a fulcrum.

7. The shifting foot as recited in claim 6, wherein said connecting portion is formed with an upwardly directed socket to receive in interfitting relationship a post of a trailer jack.

8. The shifting foot as recited in claim 7, wherein said downwardly directed force transmitting surface is located in general vertical alignment with said socket, whereby a vertical force exerted from a trailer jack into the shifting foot is transmitted through the foot at the general location of the force transmitting surface of the foot.

9. The shifting foot as recited in claim 7, wherein said through recess comprises a downwardly directed slot.

10. The shifting foot as recited in claim 6, wherein there is at the lower end of the ground support portion a laterally extending ground engaging support platform connected to said ground support portion of the foot.

11. The shifting foot as recited in claim 10, wherein said platform has a laterally extending through slot adapted to permit insertion therethrough of the shifting rod for ground engagement.

12. The shifting foot as recited in claim 11, wherein said through recess is a downwardly directed slot, and said lateral slot communicates openly with said downwardly directed slot.

* * * * *